No. 711,637. Patented Oct. 21, 1902.
A. LIST.
DROP GATE.
(Application filed Mar. 29, 1902.)
(No Model.) 3 Sheets—Sheet 2.
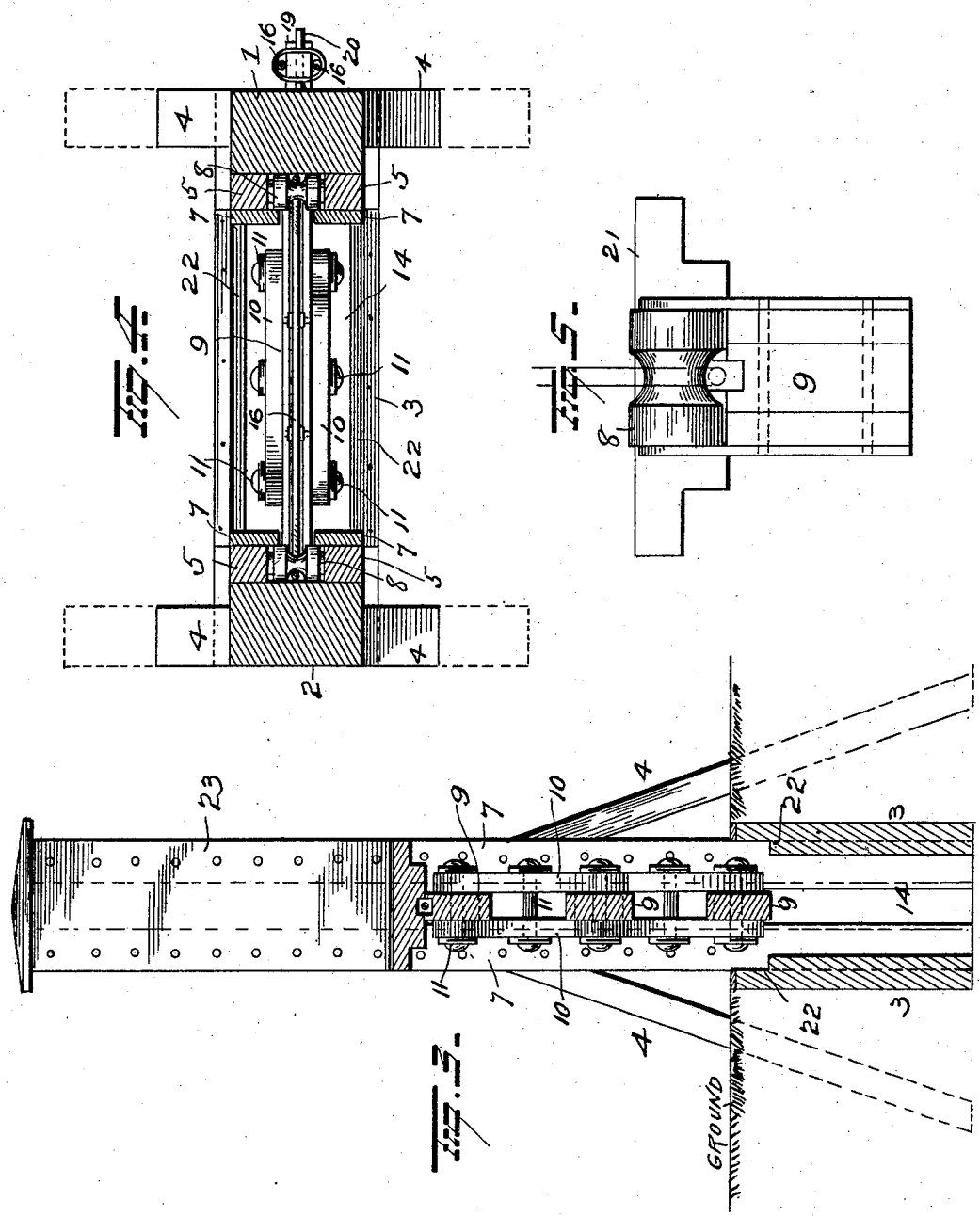

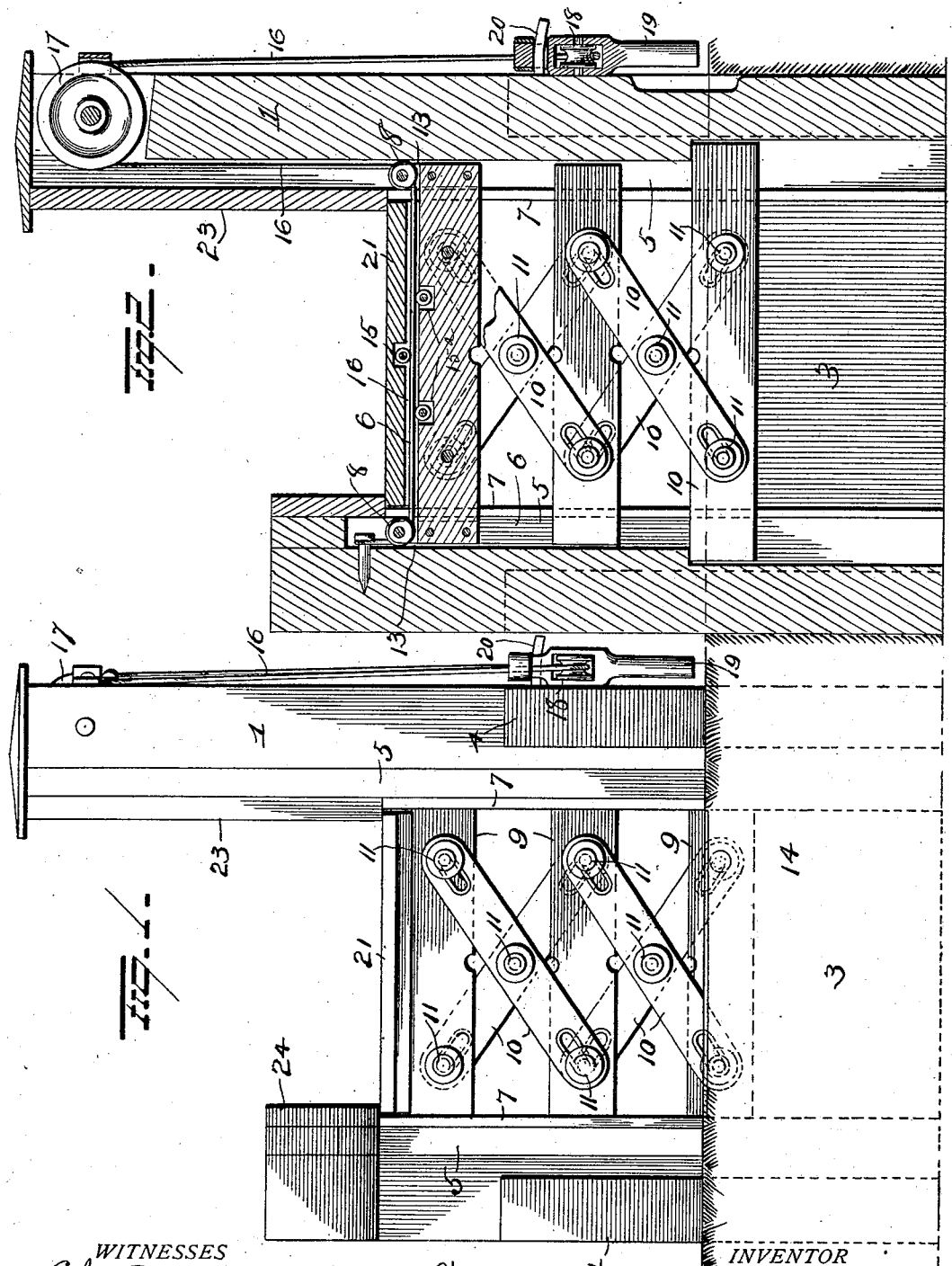

No. 711,637. Patented Oct. 21, 1902.
A. LIST.
DROP GATE.
(Application filed Mar. 29, 1902.)
(No Model.) 3 Sheets—Sheet 3.
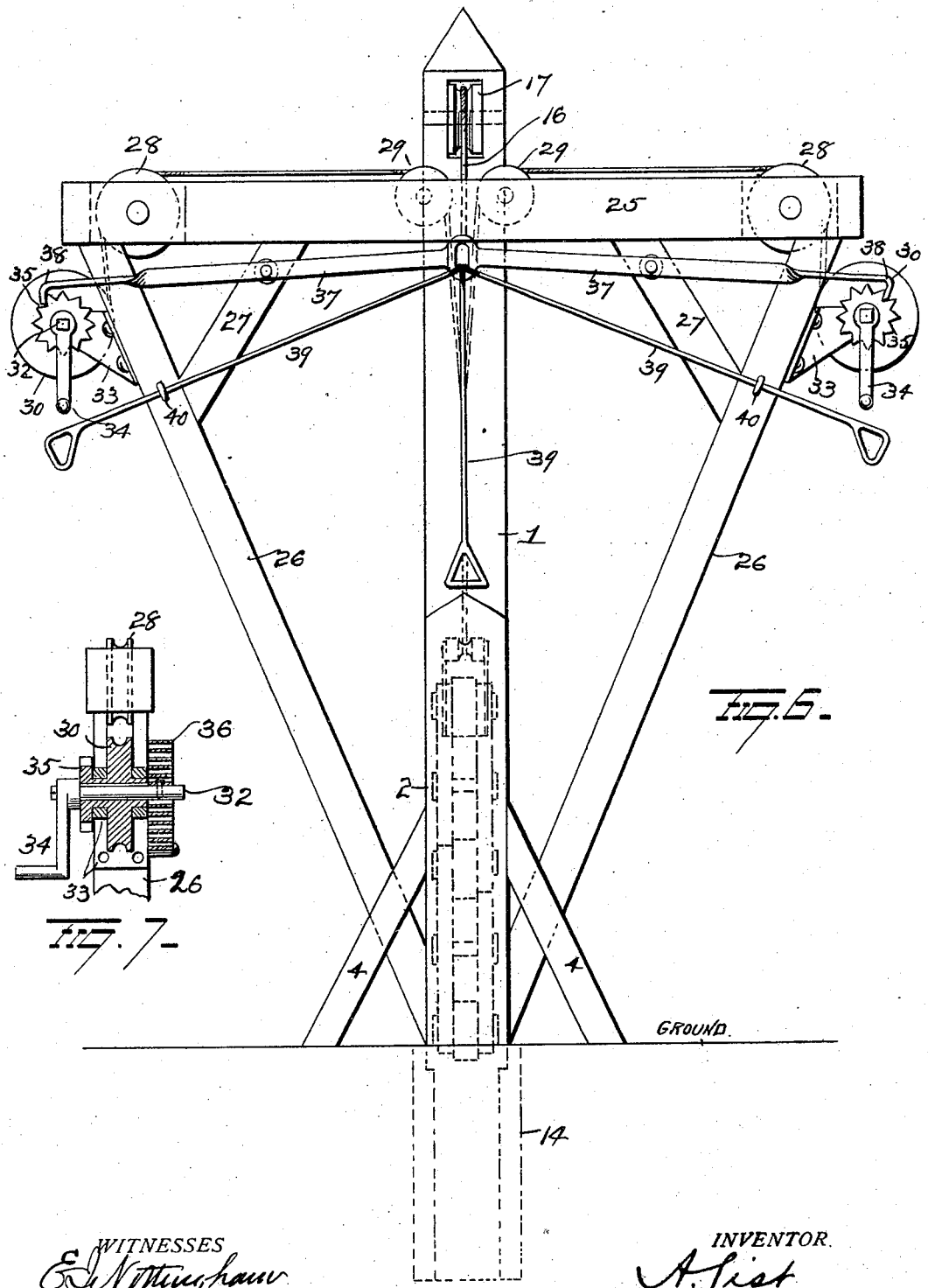
WITNESSES
INVENTOR

UNITED STATES PATENT OFFICE.

ADOLPH LIST, OF CAPE GIRARDEAU, MISSOURI.

DROP-GATE.

SPECIFICATION forming part of Letters Patent No. 711,637, dated October 21, 1902.

Application filed March 29, 1902. Serial No. 100,580. (No model.)

*To all whom it may concern:*

Be it known that I, ADOLPH LIST, a resident of Cape Girardeau, in the county of Cape Girardeau and State of Missouri, have invented certain new and useful Improvements in Drop-Gates; and I do hereby declare the following to be a full, clear, and exact description of the invention, such as will enable others skilled in the art to which it appertains to make and use the same.

My invention relates to an improvement in drop-gates, the object of the invention being to provide an improved gate of this character which will of its own weight drop into a receptacle in the ground when its supporting mechanism is released and which can be readily elevated to its closed position.

A further object is to provide an improved gate which will fold upon itself into small compass when dropped to its open position.

A further object is to provide improved mounting and operating mechanism for a gate of this character which will permit the gate to be operated by persons on foot, on horseback, or in a vehicle.

With these objects in view the invention consists in certain novel features of construction and combinations and arrangements of parts, as will be more fully hereinafter described, and pointed out in the claims.

In the accompanying drawings, Figure 1 is a view in elevation illustrating my improvements. Fig. 2 is a view in section of the same. Fig. 3 is a view in section taken at right angles to Fig. 2. Figs. 4 and 5 are views of details of construction, and Figs. 6 and 7 are views illustrating additional operating mechanism for the gate and a slight modification of the support therefor.

1 and 2 represent two posts, the former of greater height than the latter, and boards 3 connect the lower ends of these posts at both sides and form a box or receptacle 14 to be sunk into the ground and lie practically flush with the roadway, and braces 4 are driven into the ground and secured to the posts.

To the inner faces of the posts 1 and 2 strips 5 are secured and spaced apart, forming grooves 6, and to the outer faces of these strips 5 wider strips 7 are secured to contract the outer portion of the grooves and retain rollers 8 therein, as will be hereinafter explained. Into these grooves 6 horizontal gate-bars 9 project and are movable therein. The bars 9 are connected by diagonal bars 10, pivotally connected at their ends to the bars 9 and between their ends, together, by bolts 11. The openings in bars 10, where they receive bolts 11, are elongated to permit of the desired play at the pivotal connection, and these openings are metal-cased to prevent wear and reduce friction, and the opposite edges of bars 9 at their center are notched to receive central bolts 11 when the gate is folded, the diagonal bars 10 permitting bars 9 to come together when the gate is dropped into the ground.

To the upper bar 9, at each end thereof, brackets 13 are secured and carry rollers 8, movable in the grooves 6 in posts 1 and 2, and a roller 15 is provided midway between the ends of platform 21, and rollers 15ª are mounted in the upper bar 9 and at the upper edge thereof. A rope or chain 16 is passed over a pulley 17 in the upper end of post 1, thence down groove 6 in post 1 and beneath rollers 8 and 15, and secured at its end to post 2 above the highest point of movement of upper bar 9. The opposite end of the rope of chain 16 is passed around a pulley 18 in a weighted handle 19 and secured to post 1 near its upper end, so that when the handle 19 is pulled down the gate will be drawn up to its highest position. A pin 20 is provided in one side of post 1 to enter an opening in handle 19 and secure the handle against upward movement, and thereby hold the gate closed; but when said handle is released the gate will fall of its own weight to its open position.

On the upper bar 9 a platform 21 is secured and grooved at its side edges to fit snugly on internal shoulders 22 in box 14 and entirely close the box when the gate falls to its open position, and hence prevent the box from becoming filled with dirt, snow, and the like, the upper edges of the box being preferably protected by a covering of metal to prevent wear of the box.

The groove 6 in post 1 above the platform 21 is closed by a plate 23, which together with a plate 24 on the inner face of post 2 serves as a stop to limit the upward movement of the gate, and the lower bar 9 is made longer than the others and is movable in separate grooves in the posts, which grooves terminate near the road-level to prevent the lower bar 9 being raised beyond this point.

In Figs. 6 and 7 I have shown a form of operating mechanism in addition to that above described in which I provide post 1 with a cross-beam 25, braced by suitable diagonal beams 26, secured to post 1 at their lower ends and at their upper ends to the outer ends of beam 25, and short brace-bars 27 connect beam 25 and braces 26, as clearly shown. Of course this particular construction of braces is not essential, as a great many other constructions might be employed to support my improved operating mechanism.

Large pulleys 28 are mounted in the outer ends of beam 25, and small pulleys or rollers 29 are mounted on opposite sides of the central opening in the beam for ropes or chains 29, preferably spliced to main rope or chain 16. The outer ends of ropes or chains 29 are passed around pulleys 28 and around and secured to pulleys 30. Each pulley 30 is secured on a shaft 32, mounted to turn in a bracket 33, secured to brace-beam 26. A crank 34 is secured on shaft 32, and a toothed wheel 35 is secured on the shaft for a purpose which will hereinafter appear. A coiled spring 36 is located on shaft 32 and is secured at one end to the shaft and at its other end to the bracket, so that the turning of the pulley 30 will wind said spring.

Each toothed wheel 35 is normally held against rotation by a rod 37, pivoted between its ends on bar 27 and bent at its outer end, forming a dog 38 to engage the teeth of the wheel.

The inner ends of the rods 37 are made with alined openings, with which three pull-rods 39 are connected, one extending down post 1 for the use of pedestrians and the other two supported in eyes 40 on brace-beams 26 and terminating in easy reach of occupants of a vehicle or horseback-riders to permit the ready opening of the gate from either side.

With this form of my invention the weight 19 is never secured, but left free to rise and fall as the gate moves.

To open the gate, one of the rods 39 is given a pull, which releases the dogs 38 from toothed wheels 35 and permits the gate to fall, thus turning pulleys 30 and winding springs 36. To close the gate, after passing through the operator winds crank 34, which operation is assisted by the unwinding of springs 36 and the weight 19 to pull the gate to its closed position, in which it is held by the dogs.

Weights might be employed instead of the springs 36, and a great many other slight changes and alterations might be resorted to in the general form and arrangement of the several parts described without departing from the spirit and scope of my invention, and hence I would have it understood that I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a drop-gate, the combination of posts grooved to receive a gate, a pulley in one post above the gate, pulleys carried by the gate, a rope or chain secured to one post, passed beneath the gate-pulleys and over the post-pulley, and means for operating said rope or chain to raise the gate and permit it to lower.

2. In a drop-gate, the combination of posts grooved to receive a gate, a pulley carried by one post above the gate, pulleys or rollers carried by the gate, a rope or chain secured to one post above the gate, passed beneath the gate-pulleys, over the post-pulley and secured to the last-mentioned post, and a weighted handle having a pulley thereon supported on the rope or chain between the post-pulley and the point of attachment of the rope or chain.

3. In a drop-gate, the combination with parallel posts spaced apart and having their adjacent faces grooved longitudinally, of a folding gate mounted to slide in said grooves, a box or receptacle between the posts sunk in the ground and flush with the roadway, rollers carried by the upper section of the gate and movable in the grooves in the posts, a pulley in the upper portion of one post, a rope or chain passed over said pulley, beneath said rollers, and secured to the other post, and means for pulling said rope or chain to raise the gate to its closed position, and secure it in such position.

4. In a drop-gate, the combination with parallel posts spaced apart and grooved in their adjacent faces, a gate to slide in said grooves and a box or receptacle sunk into the ground and into which the gate slides, a rope or chain to raise said gate, a pulley in the post over which the rope or chain is passed, a weight secured on this rope or chain, a cross-beam carried by the post, pulleys at the ends of this beam over which ropes or chains are passed and secured to the first-mentioned rope or chain, crank-shafts mounted at the outer ends of said beams, pulleys loose on these shafts to which a rope or chain is secured, a spring secured at one end to the shaft and at its other end to a rigid support, a toothed wheel on the shaft, pivoted rods having dogs at their ends to engage said toothed wheels, and pull-rods to operate said rods to release the toothed wheels and permit the gate to fall to its open position.

In testimony whereof I have signed this specification in the presence of two subscribing witnesses.

ADOLPH LIST.

Witnesses:
EDWARD A. KIMMEL,
LOUIS H. TOBLER.